Oct. 13, 1925.

J. SCHNEIBLE

DISTILLATION APPARATUS

Filed Nov. 12, 1923

1,557,112

Inventor:
Joseph Schneible,

Patented Oct. 13, 1925.

1,557,112

UNITED STATES PATENT OFFICE.

JOSEPH SCHNEIBLE, OF CHICAGO, ILLINOIS; BEATRICE SCHNEIBLE INGRAM, ADMINISTRATRIX OF SAID JOSEPH SCHNEIBLE, DECEASED, ASSIGNOR TO CLAUDE D. SCHNEIBLE, K. F. SCHREIER, AND BENJAMIN B. SCHNEIDER, AS TRUSTEES UNDER THE NAME OF THE SCHNEIBLE TRUST.

DISTILLATION APPARATUS.

Application filed November 12, 1923. Serial No. 674,286.

*To all whom it may concern:*

Be it known that I, JOSEPH SCHNEIBLE, a citizen of the United States, residing at Chicago, in the county of Cook and State of Illinois, have invented a new and useful Distillation Apparatus, of which the following is a specification.

Figure 1:
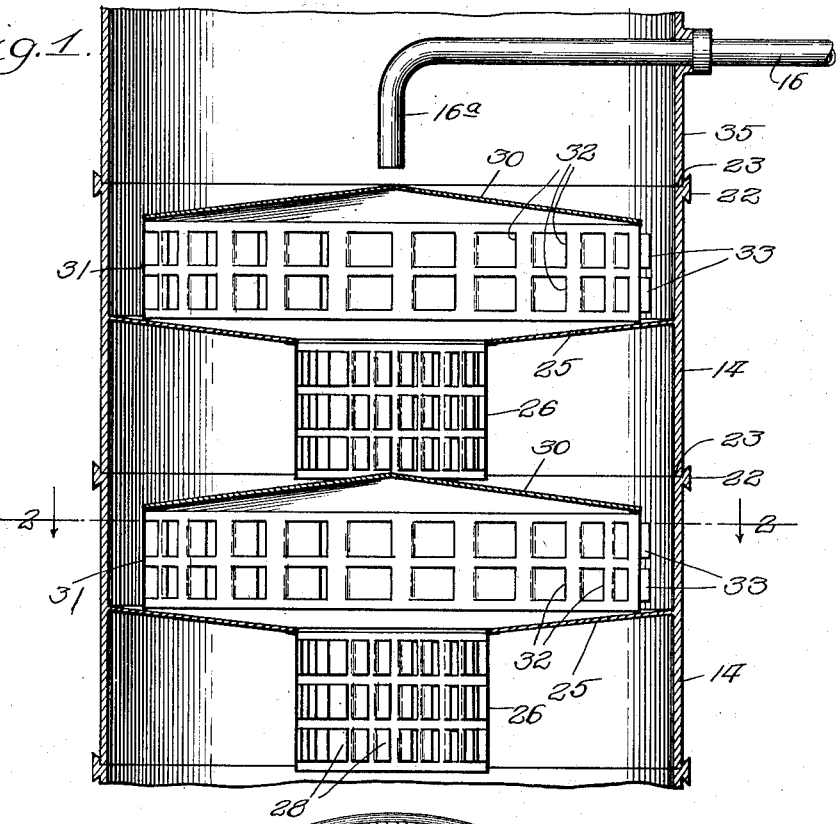
Figure 2:
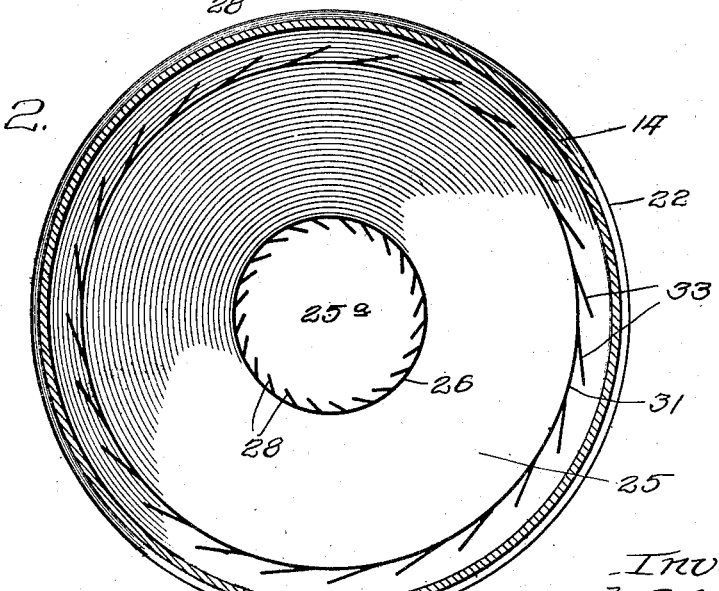

The present invention relates to improvements in the construction of distilling columns and more particularly to the construction of the parts making up the distilling or stripping section thereof. The construction of the present invention is more particularly suitable for use in distilling columns of the type described in my copending application, Serial Number 433,376, filed December 27, 1920, and in my co-pending application, Serial Number 674,285, filed of even date herewith. The invention will be more fully understood from the following description, illustrated by the accompanying drawings in which, Figure 1 is a vertical sectional view through a portion of a column embodying the present invention;

Figure 2 is a transverse sectional view on the line 2—2 of Fig. 1.

In Figure 1 of the drawings there is illustrated a portion of a distilling or stripping section of a unitary column construction, this section being made up of superimposed units 14, of which any desired number may be employed. Each of these units is provided at its upper end with a flange 22 of generally triangular form and with a shoulder 23 into which the wall of the next unit above is fitted. This construction of joint between the sections is more fully set forth in my prior Patent Number 1,366,955.

Within each unit the baffle ring 25 is secured to the wall and extends inwardly, leaving a central opening 25ª for the passage of vapor and liquid. From the inner rim of the baffle ring 25 a cylindrical skirt 26 depends, and is provided with peripheral openings with inwardly directed vanes 28 which function in a manner similar to the vanes of a turbine rotor, imparting to the vapor passing through them a positive rotary or whirling movement.

Above each of the baffle rings 25 is provided a deflector plate 30, which is arranged centrally within the column, its outer rim being spaced from the inner wall to provide a free passage for vapors. From the outer rim of the deflector plate 30 a cylindrical skirt 31 depends, this skirt resting upon the baffle ring 25 and serving as a support for the deflector plate 30. The skirt 31 is preferably provided at its lower end with short projecting lugs, which leave a space between it and the baffle ring 25 for the passage of liquid. The depending skirt 31 is provided with peripheral openings 32, and with outwardly projecting vanes 33 at each of these openings, these vanes functioning in a manner similar to those provided in the depending skirt 26, as hereinbefore described.

In the preferred construction shown in the drawings, the baffle rings 25 are given a slight downward pitch and the deflector plates 30 are constructed as relatively flat cones with a slight pitch.

In Figure 1 of the drawings, the distribution of in-fed liquid is also shown. A section or unit 35 is provided at a suitable point in the column, into which the pipe 16 carrying the material to be distilled is brought. This pipe terminates in a downwardly depending portion 16ª, which opens directly above the center of the deflector plate 30 of the next lower unit, the in-fed material being properly distributed by this plate.

In operation, the vapors from below rise around the cylindrical skirt 26 depending from the baffle ring 25. They are forced by the baffle ring to pass through the openings 27 in the skirt 26 and in doing so, are given a positive rotary or whirling motion by the vanes 28. As they continue their rising movement, they are forced by the deflector plate 30 to pass outwardly through the openings 32 in the cylindrical skirt 31 depending from the deflector plate. In doing this, they are again imparted positive rotary movement by the vanes 33. Descending liquid is distributed by the deflector plate 30 and forced to descend exteriorly of the skirt 31. The whirling vapors passing out through the openings 32 in the latter break up the descending liquid into a fine mist and impart to it a like whirling or rotary movement. The finely subdivided condition of the liquid causes an extensive and intimate contact between the liquids and the vapors. Similarly, the baffle ring 25 causes the liquid to be guided to the interior of the depending cylindrical skirt 26, where a like subdivision and contact between rising vapors and descending reflux is brought about by the action of the vanes 28. In this manner, an extremely effective heat interchange results between the reflux and the vapors.

I claim:

1. In a column still construction, a unit having a baffle ring extending from its wall inwardly to an open central space, a cylindrical skirt depending from the inner rim of said ring, peripheral openings in said skirt and vanes at each of said openings for imparting rotary movement to vapors passing therethrough.

2. In a column still construction, a unit having a central deflector plate providing an open space between its outer rim and the wall of the unit, a cylindrical skirt depending from the outer rim of said deflector plate, said cylindrical skirt being provided with peripheral openings and vanes at each of said openings for imparting rotary movement to vapors passing therethrough.

3. In a column construction, a unit having a baffle ring extending from its wall to an inner central opening, and means for guiding descending liquids directly downward from said opening and imparting rotary movement thereto within the opening.

4. In a column construction, a unit having a baffle ring extending from its wall to an inner central opening, a central deflector plate above said baffle ring, said plate leaving an open space between its outer rim and the wall of the unit, means for guiding descending liquid from the rim of the deflector plate downward and bringing vapor into contact therewith with a positive rotary movement, and means for guiding descending liquid downwardly from the central opening in the baffle ring and for bringing vapor into contact therewith with a positive rotary movement.

5. In a column construction, a condenser unit having a downwardly pitched baffle ring extending from its wall inwardly, a cylindrical skirt depending from the inner rim of the baffle ring, said depending skirt being provided with peripheral openings and with internally directed vanes at said opening, a central deflector plate above the baffle ring, a cylindrical skirt depending from its outer rim, said skirt resting upon the baffle ring and thereby supporting the deflector plate, the skirt being provided with peripheral openings and with outwardly directed vanes at said openings.

JOSEPH SCHNEIBLE.